US007629420B2

(12) United States Patent
Dawkins et al.

(10) Patent No.: US 7,629,420 B2
(45) Date of Patent: Dec. 8, 2009

(54) TRI-BLEND RESIN OF PBI, PAEK, AND PEI

(75) Inventors: Bobby G. Dawkins, Charlotte, NC (US); Michael Gruender, Charlotte, NC (US); Gregory S. Copeland, Tega Cay, SC (US); Jerry Zucker, Charleston, SC (US)

(73) Assignee: PBI Performance Products, Inc., Charlotte, NC (US)

( * ) Notice: Subject to any disclaimer, the term of this patent is extended or adjusted under 35 U.S.C. 154(b) by 318 days.

(21) Appl. No.: 11/671,494

(22) Filed: Feb. 6, 2007

(65) Prior Publication Data

US 2008/0188628 A1   Aug. 7, 2008

(51) Int. Cl.
C08L 77/06 (2006.01)
C08L 79/06 (2006.01)
C08L 79/08 (2006.01)

(52) U.S. Cl. ............... 525/435; 525/420; 525/425; 525/432; 525/436; 525/931

(58) Field of Classification Search ............... 525/420, 525/425, 432, 435, 436, 931
See application file for complete search history.

(56) References Cited

U.S. PATENT DOCUMENTS

| 4,912,176 A | 3/1990 | Alvarez et al. |
| 4,973,630 A | 11/1990 | Leung et al. |
| 5,380,477 A | 1/1995 | Kent et al. |
| 6,753,365 B2 * | 6/2004 | Brown et al. ............ 524/123 |
| 2004/0005474 A1 | 1/2004 | Charnock et al. |

* cited by examiner

Primary Examiner—Ana L Woodward
(74) Attorney, Agent, or Firm—Hammer & Associates, P.C.

(57) ABSTRACT

A polymer blend comprises PBI, PAEK, and PEI. A method of making the foregoing blend comprises the steps of intimately blending PBI, PAEK, and PEI by dissolving PBI, PAEK, and PEI in a strong acid or melt blending PBI, PAEK, and PEI.

5 Claims, No Drawings

TRI-BLEND RESIN OF PBI, PAEK, AND PEI

FIELD OF THE INVENTION

An engineered plastic is a blend of PBI, PAEK, and PEI.

BACKGROUND OF THE INVENTION

Polybenzimidazoles (PBI), polyaryleneketones, also referred to as polyaryletherketones, (PAEK), and polyetherimides (PEI) are known. See: Billmeyer, F. W., *Textbook of Polymer Science*, 3$^{rd}$ Edition, John Wiley & Sons, New York City, N.Y. (1984).

In U.S. Pat. No. 4,912,176, a sintered molded article is made from a homogenous blend of PBI and PAEK. The homogenous blend is formed by dry blending the constituent particulates in a high speed mixer. U.S. Pat. No. 4,912,176, column 7, lines 38-54.

In U.S. Pat. No. 4,973,630, a miscible composition is made from PBI and PEI. The miscible composition is prepared by first dissolving the constituents in a mutual polar solvent, such polar solvents being: e.g., N,N-dimethylformamide, N,N-dimethylacetamide (DMAc), or N-methylpyrrolidone (NMP). U.S. Pat. No. 4,973,630, column 8, lines 18-24.

While each of the foregoing blends has good attributes, there continues to be a need to find new methods of making engineered plastics and new engineered plastics that have still better properties.

SUMMARY OF THE INVENTION

A polymer blend comprises PBI, PAEK, and PEI. A method of making the foregoing blend comprises the steps of intimately blending PBI, PAEK, and PEI by dissolving PBI, PAEK, and PEI in a strong acid or melt blending PBI, PAEK, and PEI.

DESCRIPTION OF THE INVENTION

Polybenzimidazole (PBI) refers to a polymer having a high thermal stability and excellent resistance to oxidative or hydrolytic degradation. One embodiment of PBI may be represented by a polymer having the following repeat units:

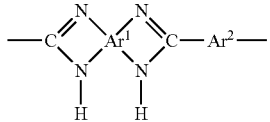

where Ar$^1$ represents a tetravalent aromatic moiety, e.g.,

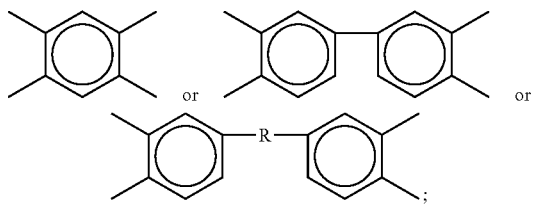

where R may represent, for example, —O—, —SO$_2$—, -(CH$_2$)$_x$, and x being a positive integer, where Ar$^2$ represents a divalent aromatic moiety, e.g.,

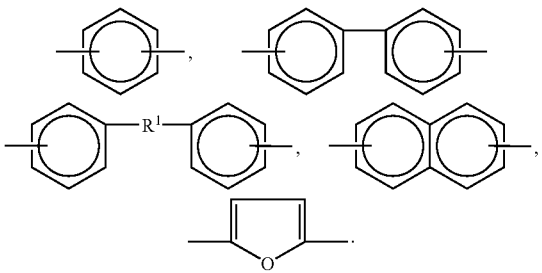

where R$^1$ represents, for example, —O—, -(CH$_2$)$_x$, —Si(CH$_3$)$_2$—O—Si(CH$_3$)$_2$—, and x being a positive integer. PBI is commercially available from PBI Performance Products, Inc. of Charlotte, N.C.

Polyaryleneketone, also referred to as polyaryletherketone, (PAEK) refers to a polymer having good chemical resistance and moderate compressive strength but poorer mechanical properties at elevated temperatures when compared to PBI. One embodiment of PAEK may be represented a polymer having the following repeat units:

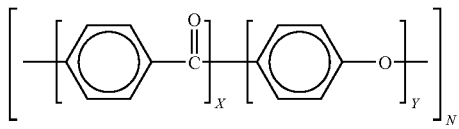

where X, Y, and N are positive integers. There are several variants Of PAEK. Examples of the variants include, but are not limited to:

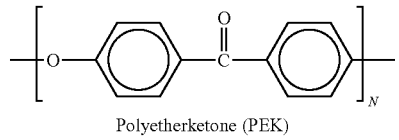
Polyetherketone (PEK)

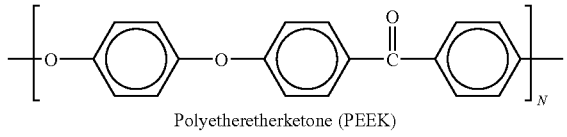
Polyetheretherketone (PEEK)

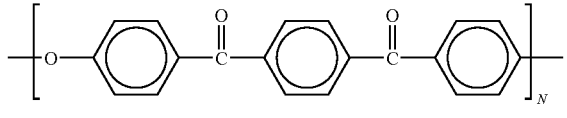
Polyetherketoneketone (PEKK)

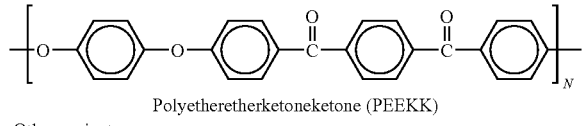
Polyetheretherketoneketone (PEEKK)

Other variants

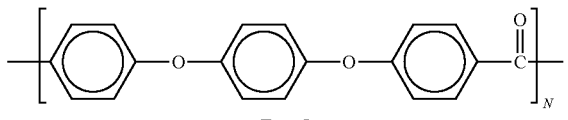
Type I

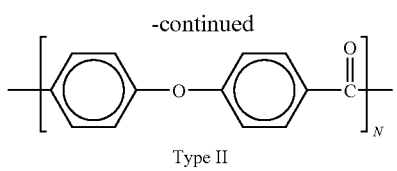

Type II

PAEKs are commercially available under the tradename VICTREX® from Victrex plc of Lancashire, UK.

Polyetherimide (PEI) refers to a polymer having high heat resistance, high strength-to-weight ratio, high modulus, excellent non-flammability characteristics, processability on conventional molding equipment, low smoke evolution, high dielectric strength, a stable dielectric constant and dissipation factor over a wide range of temperatures and frequencies, and good chemical resistance except to, for example, chlorinated solvents, ethylene glycol, and N,N-dimethylformamide. One embodiment of PEI may be represented a polymer having the following repeat units:

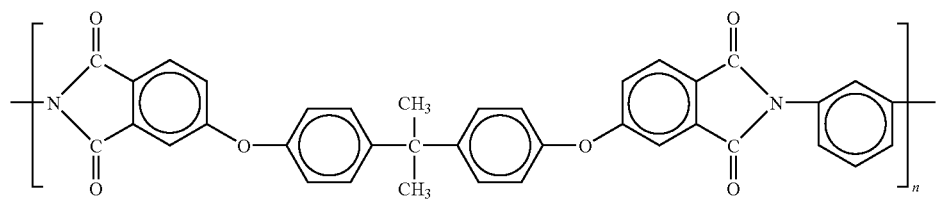

where n is a positive integer. One class of PEI is commercially available under the tradename ULTEM® from General Electric Plastics of Pittsfield, Mass.

The tri-blend composition comprises PBI, PAEK, and PEI. In one embodiment, the minimum amount of each component may be 10% by weight. In another embodiment, the maximum amount of any one component may be 85%. In another embodiment, the maximum amount of any one component may be 75%.

The tri-blend's components, PBI, PAEK, and PEI, are intimately blended and then harvested. Intimately blending is a process where the components are mixed. Harvesting refers to the process for recovering the intimately mixed tri-blend for use. Each is discussed in greater detail below.

Intimately blending is a process where the components are mixed. In one embodiment, intimately blending may be accomplished by blending solutions of the components. When blending solutions, a common solvent for each component may be used. One group of common solvents may be strong acids. Strong acids may be selected from the group of sulfuric acid, methane sulfonic acid, trifluoromethane sulfonic acid, trifluoroacetic acid, dichloroacetic acid, and combinations thereof. In one embodiment, sulfuric acid is preferred. In another embodiment, intimately blending may be accomplished by melt blending. When melt blending, the components may be intimately blended in an extruder. Prior to blending in the extruder, the components may be dry blended in, for example, a tumbler or a high shear mixer.

Harvesting is the process for recovering the intimately blended tri-blend for use. In one embodiment, when the tri-blend is made by the solution process, the tri-blend may be recovered by: precipitating out the tri-blend in a non-solvent, for example water or methanol, filtering the tri-blend from the common solvent, washing the tri-blend, neutralizing any residual solvent in the tri-blend, washing the neutralized tri-blend, and drying the tri-blend. This harvesting may include all of the foregoing steps or any combination of those steps as needed. In another embodiment, when the tri-blend is made by the melt blend process, the tri-blend may be ground to the appropriate particulate size.

The foregoing tri-blends may be used, for example, in the manufacture of semiconductor devices including microchips, flat panel displays, and the like. In the manufacture of such apparatus, materials may be vapor deposited upon a substrate. During the vapor deposition, the substrates are held by jigs, fixtures, and/or molds. These jigs, fixtures, and/or molds must be inert to the vapor deposition environment, so to prevent contamination arising from the off-gassing, or the like, of the materials from which the jigs, fixtures, and molds are made. Likewise, other components of the vapor deposition chamber may also be made from the blends discussed herein. Furthermore, these blends may be used in like components of semiconductor etching, ashing, wafer transportation, and as hard-disc media cassettes where support components may function as a seal, insulator, holding or transportation device which must endure exposure to the harsh process environment. Further application for the blends discussed herein can be found in various industrial, chemical, and petrochemical processes where the temperature resistance, chemical resistance, strength and modulus of this material enables production in harsher environments or extends the life cycle of parts used in these processes.

EXAMPLES

The foregoing description of the invention is further illustrated by way of the following, non-limiting examples.

Raw materials: The following materials were used: PBI—PBI 100 (Tg—434° C.) from PBI Performance Products; PAEK—VICTREX® PEEK 150 PF (Tg—145° C.) from Victrex plc; and PEI—ULTEM® 100 (Tg—218° C.) from GE Plastics.

Stock solutions: Stock solutions were prepared as follows: PBI—100 g of PBI and 900 g of 96% $H_2SO_4$ were added to a 1000 ml three-necked flask equipped with a mechanical stirrer (4 blades) and nitrogen inlet/outlet. The mixture was stirred for 16 hours (h) at 60° C. and cooled to room temperature to produce a 10% PBI stock solution. PAEK—100 g of PEEK and 900 g of 96% $H_2SO_4$ were added to a 1000 ml three-necked flask equipped with a mechanical stirrer (4 blades) and nitrogen inlet/outlet. The mixture was stirred for 16 h at room temperature to produce a 10% PAEK stock solution. PEI—100 g of PEI and 900 g of 96% $H_2SO_4$ is added to a 1000 ml three-necked flask equipped with a mechanical stirrer (4 blades) and nitrogen inlet/outlet. The mixture was stirred for 0.5 h at room temperature to produce a 10% PEI stock solution.

Solution blends: Solution blends of the PBI/PAEK/PEI were prepared as follows: PEI incrementally added—Solution blends, where PEI is incrementally added, sufficient solution of 10% PEI stock solution is added and stirred for 1.5 h at room temperature, poured into one liter of fast stirring water in a Waring blender, filtered to collect the tri-blend. The tri-blend is washed with water, neutralized with ammonium hydroxide, filtered, washed again with water, and then dried for overnight under vacuum at 120° C. PAEK incrementally added—Solution blends, where PAEK is incrementally added, sufficient solution of 10% PAEK stock solution is added and stirred for 1.5 h at room temperature, poured into one liter of fast stirring water in a Waring blender, filtered to collect the tri-blend. The tri-blend is washed with water, neutralized with ammonium hydroxide, filtered, washed again with water, and then dried for overnight under vacuum at 120° C.

Melt blends: Melt blends of the PBI/PAEK/PEI were prepared as follows: Components were weighted, pre-dry-mixed, and fed through a Brabender extruder with an ¾ inch diameter barrel 18 in long with three heating zones at 50-100 rpm. 100 g of the blend were extruded under the following conditions:

| PBI/PAEK/PEI | 1$^{ST}$ ZONE (° C.) | 2$^{ND}$ ZONE (° C.) | 3$^{RD}$ ZONE (° C.) |
|---|---|---|---|
| 50/50/0 | 310 | 370 | 400 |
| 45/45/10 | 300 | 370 | 390 |
| 37.5/37.5/25 | 290 | 360 | 380 |
| 25/25/50 | 300 | 360 | 380 |
| 12.5/12.5/75 | 280 | 350 | 370 |
| 50/0/50 | 290 | 370 | 400 |
| 45/10/45 | 280 | 370 | 390 |
| 37.5/25/37.5 | 280 | 370 | 390 |
| 25/50/25 | 285 | 370 | 390 |
| 12.5/75/12.5 | 280 | 370 | 390 |

Testing: Samples were tested for glass transition temperature (Tg) and for thermal stability by TGA. Tg was measured using a differential scanning calorimeter (TA Instruments DSC 2020 Modulated DSC), samples were continuously flushed with nitrogen. Tgs were measured for both scanning the first heating, cooling, and then scanning the second heating with a heating rate of 10° C./min. The rate of cooling the sample between the two heating was 10° C./min. TGA measurements were made using a TGA/SDTA 857e Mettler Toledo instrument with a heating rate of 10° C./min under nitrogen.

Test results are as follows:

| PBI/PAEK/PEI | Tg1 | Tg2 | TGA | Td10 |
|---|---|---|---|---|
| Prepared by Solution Method | | | | |
| 50/50/0* | 154 | 415 | | |
| 50/50/0 | 151 | 426 | 547 | 555 |
| 45/45/10 | 157 | 405 | 535 | 539 |
| 37.5/37.5/25 | 175 | 399 | 512 | 498 |
| 25/25/50 | 193 | 429 | 424 | 489 |
| 12.5/12.5/75 | 197 | 430 | 324 | 438 |
| 50/0/50 | 199 | 431 | 459 | 599 |
| 45/10/45 | 162 | 382 | 471 | 529 |
| 37.5/25/37.5 | 182 | 395 | 483 | 512 |
| 25/50/25 | 154 | 381 | 524 | 520 |
| 12.5/75/12.5 | 168 | 426 | 535 | 552 |
| Prepared by Melt Method | | | | |
| 50/50/0* | 154 | 415 | | |
| 50/50/0 | 148 | 411 | 547 | 555 |
| 45/45/10 | 169 | 410 | 535 | 539 |
| 37.5/37.5/25 | 171 | 419 | 512 | 498 |
| 25/25/50 | 190 | 404 | 424 | 489 |
| 12.5/12.5/75 | 202 | 409 | 324 | 438 |

| | Comparison of Solution and Melt Methods | | | |
|---|---|---|---|---|
| | Solution | | Melt | |
| PBI/PAEK/PEI | TGA | Td10 | TGA | Td10 |
| 50/50/0 | 547 | 555 | 565 | 581 |
| 45/45/10 | 535 | 539 | 541 | 558 |
| 37.5/37.5/25 | 512 | 498 | 532 | 548 |
| 25/25/50 | 424 | 489 | 526 | 541 |
| 12.5/12.5/75 | 324 | 438 | 524 | 539 |
| 50/0/50 | 459 | 599 | 521 | 543 |
| 45/10/45 | 471 | 529 | 524 | 544 |
| 37.5/25/37.5 | 483 | 512 | 529 | 543 |
| 25/50/25 | 524 | 520 | 535 | 549 |
| 12.5/75/12.5 | 535 | 552 | 547 | 562 |

*Commercially available CELAZOLE TU-60 from PBI Performance Products
Tg1 = first glass transition temperature (° C.)
Tg2 = second glass transition temperature (° C.)
TGA = degradation temperature at onset (° C.)
Td10 = temperature at 10% weight loss (° C.)

The present invention may be embodied in other forms without departing from the spirit and the essential attributes thereof, and, accordingly, reference should be made to the appended claims, rather than to the foregoing specification, as indicated the scope of the invention.

We claim:

1. A method for making a tri-blend of PBI, PAEK, and PEI comprising the steps of:
    intimately blending PBI, PAEK, and PEE by dissolving PBI, PAEK, and PEI in a strong acid; and
    harvesting the tri-blend of PBI, PAEK, and PEI.

2. The method according to claim 1 wherein intimately blending by dissolving further comprising providing said strong acid from the group consisting of: sulfuric acid, methane sulfonic acid, trifluoromethane sulfonic acid, trifluoroacetic acid, dichloroacetlc acid, and combinations thereof.

3. The method according to claim 2 wherein said strong acid being sulfuric acid.

4. The method according to claim 1 wherein said PBI, PAEK, and PEI being dissolved separately and then said individual solutions being mixed.

5. The method according to claim 1 wherein harvesting the tri-blend further comprising at least one of the following steps:
    a. precipitating out and filtering the dissolved PBI, PAEK, and PEI;
    b. neutralizing the dissolved PBI, PAEK, and PEI;
    c. washing the acid from the dissolved PBI, PAEK, and PEI; or
    d. drying the dissolved PBI, PAEK, and PEI.

* * * * *